United States Patent
Miyake et al.

(10) Patent No.: US 8,084,071 B2
(45) Date of Patent: Dec. 27, 2011

(54) SESAME OIL AND PROCESS FOR PRODUCING THE SAME

(75) Inventors: Yuko Miyake, Yokohama (JP); Ikukazu Tashima, Yokohama (JP); Akihiro Nakatani, Yokohama (JP); Narihide Matsuzaki, Yokohama (JP)

(73) Assignee: J-Oil Mills, Inc., Tokyo (JP)

( * ) Notice: Subject to any disclaimer, the term of this patent is extended or adjusted under 35 U.S.C. 154(b) by 1253 days.

(21) Appl. No.: 10/587,508

(22) PCT Filed: Jan. 5, 2005

(86) PCT No.: PCT/JP2005/000008
§ 371 (c)(1),
(2), (4) Date: Apr. 20, 2007

(87) PCT Pub. No.: WO2005/073356
PCT Pub. Date: Aug. 11, 2005

(65) Prior Publication Data
US 2007/0218187 A1    Sep. 20, 2007

(30) Foreign Application Priority Data
Jan. 29, 2004   (JP) .................................. 2004-021227

(51) Int. Cl.
*A23D 9/02*    (2006.01)
*C11B 3/00*    (2006.01)
(52) U.S. Cl. ...................................... 426/417; 426/601
(58) Field of Classification Search .................. 426/417, 426/601
See application file for complete search history.

(56) References Cited

U.S. PATENT DOCUMENTS
6,033,706 A  *  3/2000  Silkeberg et al. ............. 426/417

FOREIGN PATENT DOCUMENTS
| JP | 3-53866 A | 3/1991 |
| JP | 2000-159787 A | 6/2000 |
| JP | 2000-309533 A | 11/2000 |

OTHER PUBLICATIONS

Shahidi, F et al. 1997. JAOCS 74(2)143-148.*
Menezes, F. G. T. 1950. JAOCS 27:184-186.*
Mozzami, Ali A. et al. JAOCS 81(8)719-723.*
Beroza, M. 1955. JAOCS 32:348-350.*
Fukuda, Y. et al. 1986. JAOCS 63(8)1027-1031.*
Stecher, P. G. 1968. The Merck Index. Merck & Co., Inc., Rahway, NJ. p. 943-944.*
Hui, Y. H. 1996. Bailey's Industiral Oil and Fat Products, 5$^{th}$ edition, vol. 4. John Wiley & Sons, Inc., New York, p. 201.*
Swern, D. 1982. Bailey's Industrial Oil and Fat Products, 4$^{th}$ edition, vol. 2, John Wiley & Sons, Inc., New York, p. 294-295 & 303.*
Swern, D. 1982. Bailey's Industrial Oil and Fat Products, vol. 2, 4$^{th}$ edition. John Wiley & Sons, New York, p. 264 & 317.*
Hemalatha, S. 2004. JAOCS 81(5)467.*
Liew, K. Y. et al. 1993. JAOCS 70(5)539.*
Namiki et al., Science of Sesame, Oct. 10, 1989 pp. 123-125.
Kamal-Eldin et al., JAOCS, vol. 71, No. 2 Feb. 1994 pp. 149-156.
Abe, Handbook of Oil and Fat, and Oil Food, May 25, 1988 pp. 130-131.
Yoshiko Toyoda, Japan Food Science, pp. 41-45, Jan. 2000.
Tang, Chuanhe, et al., "Functional properties of sesame oil and its physiological function", Western Grain & Oil Science, vol. 24, Ed. 2, p. 18-20, Dec. 31, 1999.
Yasuda, Kosaku, et al., "Knowledge on Oil Products", published by Saiwai Syobou, Japan, pp. 14-17 & 68-73, Jul. 20, 1985.
Mamiki, Mitsuo, et al., "Science of Sesame", 2nd Edition, published by Asakura Shoten Co., Japan, pp. 180-185, Sep. 20, 1992.

* cited by examiner

*Primary Examiner* — Carolyn Paden
(74) *Attorney, Agent, or Firm* — Birch, Stewart, Kolasch & Birch, LLP

(57) ABSTRACT

The purpose of the present invention is to provide refined sesame oil comprising a lot of lignans that have various excellent physiological properties from sesame seeds having a high lignan content.
The present invention relates to refined sesame oil having a sesamin content of 1% by weight or more and showing no bitterness; a method for the production of refined sesame oil comprising using active carbon as an absorbent in a bleaching step; a method for the production of refined sesame oil comprising controlling a bleaching temperature in a range of from 5 to 70° C. in a bleaching step with the use of activated clay active as an absorbent; and a method for the production of refined sesame oil comprising controlling a bleaching temperature in a range of from 5 to 70° C. in a bleaching step with the use of activated clay of from 0.1 to 3% by weight active as an absorbent.

15 Claims, No Drawings

SESAME OIL AND PROCESS FOR PRODUCING THE SAME

TECHNICAL FIELD

The present invention relates refined sesame oil comprising a lot of sesamins and showing no bitterness, and to a method for the production of sesame oil from sesame seeds having a high content of lignans such as sesamin and sesamolin wherein the occurrence of bitterness is suppressed during milling and refining steps.

BACKGROUND ART

It is known that sesamin contained in sesame seeds, sesame protein and sesame oil has various properties such as cholesterol-lowering, antihypertensive, anti-oxidizing, liver-protective, and fat metabolism-controlling properties (Non Patent Document 1).

The method for the extraction or refining of sesamin and episesamin having no taste or odor, and for their application to foods and drinks (Patent Document 1) is known. However, the above method should have problems in cost and processes since the refining and extraction of sesamin and episesamin are required. Furthermore, stability, production properties and taste shall be necessarily examined with respect to each of the foods or drinks as the above substances will need to be added to them.

On the other hand, an invention is known, which relates to an agent for lowering body fat comprising dioxabicyclo [3.3.0] octane derivatives including sesamin as an effective ingredient (Patent Document 2). The invention also comprises a synthesis method in addition to extraction and purification of the above compounds. The invention further comprises a highly refined agent having the effective ingredient of 99.5%. In such case, however, more serious problems shall occur in cost and processes as well as in their addition to the foods.

A method for extracting sesame lignans with a high purity and yield under a supercritical condition is also published (Patent Document 3).

Patent Document 1: Japanese Patent Application Publication Hei03 (1991)-53866

Patent Document 2: Japanese Patent Application Publication 2000-309533

Patent Document 3: Japanese Patent Application Publication 2000-159787

Non Patent Document 1: Yoshiko Toyoda: Japan Food Science p.41-45, 2000-1

Generally, sesame oil is classified into parched sesame oil prepared by parching followed by milling by means of pressing (squeezing) and/or extraction, and refined (purified) sesame oil prepared by milling followed by refining like usual vegetable oil. Parched sesame oil is utilized to actively give sesame taste or flavor mainly to Chinese and Japanese dishes. As sesame oil contains a very small amount of lignans, it is advisable to take sesame oil in the form of the refined one that is more suitable for general purposes rather than of parched one for the purpose of actively ingesting the lignans.

DISCLOSURE OF THE INVENTION

There has been no refined sesame oil commercially available, which is industrially produced by milling followed by refining from sesame seeds having a high lignan content. Most of the refined sesame oil commercially available now contain lignans such as sesamin and sesamolin in a total amount of at most about 0.9% by weight.

The present inventors found sesame seeds having a high lignan content and tried to provide refined sesame oil comprising a lot of lignans having the above-mentioned excellent physiological properties. However, it has been revealed that if sesame oil was refined from the above kind of sesame seeds by means of a usual method, various problems would be caused, including the occurrence of bitterness in the sesame oil thus obtained.

The present inventors has studied hard to solve the above problems and finally found that the bitterness can be substantially removed by reducing a particular component contained in there fined sesame oil. Specifically, the present inventors have solved the above problem of bitterness by reducing a content of sesaminol that has been formed from sesamolin contained as one of the lignans via transfer reaction in the bleaching step during the production processes of the refined sesame oil, and completed the present invention.

Thus, the present invention relates to refined sesame oil having a sesamin content of 1% by weight or more, preferably of from 1 to 3% by weight and showing no bitterness. The phrase "refined sesame oil showing no bitterness" in the present specification means refined sesame oil that is evaluated as showing "no" or "substantially no" in a sensory test described in the example of the present specification, i.e. the above phrase means that bitterness has been substantially removed from the refined sesame oil. More specifically, a semaminol content in the refined sesame oil is 0.2% by weight or less, preferably 0.15% by weight or less, more preferably 0.1% by weight or less. As mentioned early in the present specification, the term "refined sesame oil" is used in comparison with the term "parched sesame oil", and it means the sesame oil refined without passing through a parching step. Accordingly, degree of refining of the sesame oil (any content of impurities in the sesame oil) does not matter in the present invention.

The present invention further relates to a method for the production of refined sesame oil, that is, the method comprising any one of the following step: (1) using active carbon as an absorbent in a bleaching step; (2) controlling a bleaching temperature in a range of from 5° C. to 70° C. in a bleaching step with the use of activated clay as an absorbent; or (3) controlling a bleaching temperature in a range of from 5° C. to 70° C. in a bleaching step with the use of activated clay of from 0.1 to 3% by weight as an absorbent. The method for the production of the present sesame oil of the present invention, however, is not limited to the above methods.

The "lignans" means in this specification sesamin, episesamin, sesamolin and sesaminol. The "sesamins" comprises sesamin and episesamin that will be generated from sesamin by isomerization reaction in the refining steps, mainly in the bleaching step. The sesaminol, a component that is formed from sesamolin via transfer reaction in the bleaching step, comprises sesaminol and episesaminol. The sesaminol will show a peak at 10-12 min in an analysis with a high performance liquid chromatography of the lignans (column:5C18-ARII (4.6 mm×20 mm, Nakarai Tesk Ltd.), mobile phase: methanol/water=7/3, flow rate:0.8 mL/min, detection:UV 290 nm).

Since the refined sesame oil according to the present invention comprises a lot of the lignans that have various excellent physiological properties and has been deprived of sesaminol that will cause bitterness, it may be used in various kinds of food cooking and added into various kinds of foods.

According to the present invention, general-purpose refined sesame oil suitable for cooking and showing no bitterness may be produced by substantially removing bitterness from the sesame seeds having a high lignan content.

BEST MODE FOR CARRYING OUT THE INVENTION

The refined sesame oil according to the present invention is preferably produced from the sesame seeds having a high lignan content. The "seeds having a high lignan content" are natural ones that comprise sesamin of 1% by weight or more, for example, from 1 to 3% by weight, as minor constituent in oil obtained after milling by means of pressing, extraction with solvent such as hexane, diethyl ether, acetone, and alcohols such as methanol and ethanol, etc. As one example of said seeds having a high lignan content may be listed "Sesanum Indicum" that was used in the example in the present specification.

Refined sesame oil commercially available comprises sesamins of about 360-600 mg/100 g, and sesaminol of from a trace amount to 70 mg/100 g.

The refined sesame oil may be usually produced by several steps such as milling (pressing or squeezing and/or extraction), degumming, alkali refining (phosphoric acid), bleaching, dewaxing and deodorizing. According to the method of the present invention, the bitterness can be substantially removed from the refined sesame oil by reducing the content of sesaminol that has been formed from sesamolin that is relatively rich in the seeds having a high lignan content via transfer reaction in one of the following bleaching steps: (1) using active carbon, for example, of 0.1 to 3.0% by weight as an absorbent; (2) controlling a bleaching temperature in a range of from 5° C. to 70° C., preferably of from 40° C. to 70° C., more preferably of from 60° C. to 70° C. in a bleaching step with the use of activated clay as an absorbent; or (3) controlling a bleaching temperature in a range of from 5° C. to 70° C. in a bleaching step with the use of activated clay of from 0.1 to 3% by weight, preferably of from 0.5 to 1.0% by weight active as an absorbent.

There in no limitation in conditions in the bleaching step other than those defined above, for example, bleaching time and temperature in the above case (1), an amount of the active earth in the above case (2). Other conditions that are not specifically limited in the present methods may be optionally controlled in a usual range known for those skilled in the art. The active carbon and activated clay used in the present invention are known for those skilled in the art, and there is no limitation with respect to their kind, the one used in the example in the present specification being preferable.

Steps other than the bleaching may be carried out in accordance with a usual method known for those skilled in the art.

The composition and content of the lignans were analyzed according to the following high performance liquid chromatography method.

A sample prepared by dissolving sesame oil (200 mg) into chloroform (10 mL) was subjected to a high performance liquid chromatography using column:5C18-ARII (4.6mm×20 mm, Nakarai Tesk Ltd.), mobile phase:methanol/water=7/3, flow rate:0.8 mL/min, elution time:30 min, detection:UV 290 nm).

Sensory evaluation was done as follows.

Number of panelists: n=3; Evaluation method: direct tonguing of oil; Evaluation items of the presence of bitterness:Yes, No, substantially No; Evaluation items of oil flavor: Good, Usual, or Bad.

Heating evaluation was done by comparing smell of oil (500 g) heated in a pan at 180° C. (Evaluation items: Good, Usual, or Bad), and foaming of the oil was compared when butter bean was deep-fried in the oil.

The present invention will be further described by referring to the following examples, which shall not be construed to limit the scope of the present invention at all. The term "%" in the examples means "% by weight" unless stated otherwise.

EXAMPLE 1

Production of Sesame Oil Control

Fifty kg of sesame sees (Sesanum Indicum) was heated at 100° C., followed by milling and extraction with hexane to get crude sesame oil. The crude sesame oil was then mixed with aqueous solution of caustic soda (20 Baume) in an amount enough to neutralize free fatty acids, stirred at 90° C. for 5 min, centrifuged, and washed for alkali refining. The resulting oil was then dehydrated at 80° C. under reduced pressure, mixed with 2% activated clay GSF (MIZUSAWA INDUSTRIAL CHEMICLAS, LTD.) and kept at the same temperature for 30 min under the reduced pressure. After removal of the activated clay by filtration, the oil was bleached, deodorized by steam-injection at 230° C. for 40 min (total amount of the injected steam: 2%) to give refined sesame oil, which was named a control product. The lignan composition of the control product was summarized in TABLE 1.

TABLE 1

| Lignans | Control Product (mg/100 g Oil) |
|---|---|
| Sesamin | 1085 |
| Episesamin | 919 |
| Sesamolin | 9 |
| Sesaminol | 255 |

Effect of Sesaminol on Bitterness

The effect of sesaminol on bitterness was examined by adding sesaminol to salad oil as follows.

Various amounts of a high-purity sesaminol extracted from the control product were added to salad oil (commercial name:"Ajinomoto Salad Oil" produced by AJINOMOTO CO., INC.) so as to change the sesaminol content in the salad oil. The sesaminol was extracted by adding ethanol three times as much as the refined sesame oil, keeping the mixture for 2 hours in dry ice acetone to concentrate ethanol layer. The resulting concentrate of lignans was subjected to a preparative high performance liquid chromatography to isolate sesaminol. High-purity lignans (50 mg) dissolved in tetrahydrofuran (10 mL) was injected into the high performance liquid chromatography using column:5C18-ARII (280.0 mm×250 mm, Nakarai Tesk Ltd.), mobile phase:tetrahydrofuran 100%, flow rate:6.0 mL/min, elution time:60 min, detection: UV290 nm). The eluate obtained on the elution time of between 17 and 26 min was collected to give sesaminol with purity of 78%.

The results of analysis of sesaminol in the salad oil and sensory evaluation are summarized in TABLE 2.

Sensory evaluation was done as follows.

Number of panelists: n=3; Evaluation method: direct tonguing of oil; Evaluation items of bitterness: Strong, Yes, Remaining harsh taste, substantially No, or No. The results in TABLE 2 show that the more the sesaminol content is, the more bitterness is felt.

TABLE 2

| Sesaminol Content (mg/100 g salad oil) | | | | |
|---|---|---|---|---|
| 471 | 207 | 155 | 104 | 52 |
| Sensory Evaluation: Bitterness | | | | |
| Strong | Remaining harsh taste | No | No | No |

EXAMPLE 2

Reducing Effect of Various Absorbents on Bitterness

Instead of the absorbent used in the production of the control product were used the same amount (2%) of "activated clay V2R (MIZUSAWA INDUSTRIAL CHEMICLAS, LTD.)" (Comparative Example 1), "activated clay NV (MIZUSAWA INDUSTRIAL CHEMICLAS, LTD.)"(Comparative Example 2), "activated clay TONSIL (SKW East Asia Co.)" (Comparative Example 3), "diatomaceous earth (SHOWA CHEMICAL INDUSTRY CO., LTD.)" that is a filtering auxiliary (Example 1), "active carbon (Nakarai Tesk Ltd.)" (Example 2), respectively. Other bleaching conditions such as bleaching time and deodorizing conditions were the same. The results of analysis and sensory evaluation of lignans are summarized in TABLE 3.

TABLE 3

| Absorbent/ Content (mg/100 g OIL) | Control activated clay GSF | Comparative Example 1 (activated clay V2R) | Comparative Example 2 (activated clay NV) | Comparative Example 3 (activated clay TONSIL | Example 1 (diatomaceous earth) | Example 2 (active carbon) |
|---|---|---|---|---|---|---|
| Sesamin | 1085 | 1056 | 1136 | 1362 | 2032 | 1281 |
| Episesamin | 919 | 843 | 873 | 670 | 61 | — |
| Sesamolin | 9 | 14 | 13 | 32 | 778 | 450 |
| Sesaminol | 255 | 235 | 234 | 204 | — | — |
| Sensory Evaluation: Oil Flavor | Good | Good | Good | Good | Bad (hay-like smell) | Good |
| Heating Evaluation: smell & foaming | Good | — | — | — | hay-like smell, remarkable foaming | Good |
| Sensory Evaluation: Bitterness | Yes | Yes | Yes | Remaining harsh taste | No | No |

The results of TABLE 3 demonstrate that while Example 2 using the active carbon showed a small sesaminol content and no bitterness, Control, comparative Example 1, Comparative Example 2 and Comparative Example 3 showed a relatively large sesaminol content and bitterness. It is also clear that Example 1 using the filtering auxiliary, diatomaceous earth, showed no bitterness, but had problems with respect to flavor as general-purpose cooking oil and foaming in deep-frying so that it would require further treatments for strengthening of refining and the like.

EXAMPLES 3 AND 4

Reducing Effect of the Same Absorbent at Various Bleaching Temperatures on Bitterness Next, sesame oil was bleached at 60° C. (Example 3) and at 40° C. (Example 4) while the other conditions such as bleaching time were the same as in the production of the control product. The results of analysis and sensory evaluation of lignans are summarized in TABLE 4.

TABLE 4

| Bleaching condition/ Content (mg/100 g OIL) | Control 80° C. | Example 3 60° C. | Example 4 40° C. |
|---|---|---|---|
| Sesamin | 1085 | 1663 | 1893 |
| Episesamin | 919 | 425 | 56 |
| Sesamolin | 9 | 57 | 349 |
| Sesaminol | 255 | 146 | 43 |
| Sensory Evaluation: Oil Flavor | Good | Good | Usual |
| Sensory Evaluation: Bitterness | Yes | No | No |

The results of TABLE 4 demonstrate that the control product bleached at a high temperature had bitterness, but the products in Examples 3 and 4 had a small amount of sesaminol and showed no bitterness or no problem with respect to flavor as general-purpose cooking oil.

EXAMPLES 5-8

Reducing Effect at Various Bleaching Temperatures on Bitterness

The bleaching conditions were changed as follows: Example 5 (absorbent: activated clay GSF (MIZUSAWA INDUSTRIAL CHEMICLAS, LTD.) additive ratio:0.5%, bleaching temperature:60° C.), Example 6 (absorbent: activated clay GSF (MIZUSAWA INDUSTRIAL CHEMICLAS, LTD.), additive ratio:1.0%, bleaching temperature: 60° C.), Example 7(absorbent: activated clay NV (MIZUSAWA INDUSTRIAL CHEMICLAS, LTD.), additive ratio:0.5%, bleaching temperature:80° C.), and Example 8(absorbent: activated clay TONSIL (SKW East Asia Co.), additive ratio:0.5%, bleaching temperature:80° C.). The other bleaching and deodorizing conditions were the same as in the production of the control product. The results of analysis and sensory evaluation of lignans are summarized in TABLE 5.

TABLE 5

| Bleaching condition/ Content (mg/100 g OIL) | Example 5 GSF 0.5%, 60° C. | Example 6 GSF 1.0%, 60° C. | Example 7 NV 0.5%, 80° C. | Example 8 TONSIL 0.5%, 80° C. |
|---|---|---|---|---|
| Sesamin | 2021 | 1869 | 1849 | 1778 |
| Episesamin | 116 | 168 | 258 | 280 |
| Sesamolin | 589 | 366 | 377 | 371 |
| Sesaminol | 17 | 52 | 65 | 64 |
| Sensory Evaluation: Oil Flavor | Good | Good | Good | Good |
| Sensory Evaluation: Bitterness | No | No | No | No |

The results of TABLE 5 demonstrate that the sesaminol content could be reduced and no bitterness could be generated by decreasing the additive ratio of activated clay, and/or by lowering the bleaching temperature.

EXAMPLE 9

Evaluation of Cooking With Refined Sesame Oil Comprising a Lot of Lignans

Stir-fried (frit) of bean sprouts, salad dressing and Japanese deep-fried food ("Tempura") prepared using salad oil for household use (commercial name:"Ajinomoto Salad Oil" produced by AJINOMOTO CO., INC.) and the refined sesame oil comprising a lot of lignans produced in the Example (absorbent: activated clay GSF (MIZUSAWA INDUSTRIAL CHEMICLAS, LTD), additive ratio:2%, bleaching temperature:60° C., bleaching time:30 min) were subjected to the sensory evaluation. Sensory evaluation was done as follows (Number of panelists: n=11):

Score in each evaluation:+2 for "very strong" and "very good"; +1 for "strong" and "good"; 0 for "usual"; −1 for "weak" and "bad"; and −2 for "very weak" and "very bad"; and overall evaluation:10 point-rating.

Cooking of the Stir-fried Bean Sprouts

Bean sprouts (250 g) were stir-fried for 3 min on a frying pan high-heated and greased with the above salad oil or the refined sesame oil (12.5 g). The cooked stir-fried bean sprouts was dished up on each plate and subjected to the sensory evaluation. The results of the sensory evaluation are summarized in TABLE 6, which demonstrate that the food cooked with the refined sesame oil comprising a lot of lignans got the same overall evaluation as that with the salad oil for household use and better evaluation in aroma and flavor.

TABLE 6

| Evaluation Item | Salad oil | T-test | Refined sesame oil comprising a lot of lignans |
|---|---|---|---|
| Strength of oil aroma | −0.09 | ? | 0.18 |
| Goodness of oil aroma | 0.18 | ? | 0.55 |
| Strength of oil flavor | −0.09 | ? | 0.09 |
| Goodness of oil flavor | 0.09 | ? | 0.55 |
| Strength of body taste | −0.09 | ? | 0.36 |

TABLE 6-continued

| Evaluation Item | Salad oil | T-test | Refined sesame oil comprising a lot of lignans |
|---|---|---|---|
| Overall Evaluation | 5.00 | | 5.27 |

\*\*: $p < 0.01$,
\*: $p < 0.05$,
?: $p < 0.3$

Preparation of Salad Dressing

Thin slices of cucumber were seasoned with the mixture of oil/vinegar/salt/pepper(30/10/2/0.5) and subjected to the sensory evaluation. The results of the sensory evaluation are summarized in TABLE 7, which demonstrate that the food cooked with the refined sesame oil comprising a lot of lignans got the same overall evaluation as that with the salad oil for household use and better evaluation in oil aroma, flavor and aftertaste.

TABLE 7

| Evaluation Item | Salad oil | T-test | Refined sesame oil comprising a lot of lignans |
|---|---|---|---|
| Strength of oil aroma | 0.18 | | 0.36 |
| Goodness of oil aroma | 0.36 | ? | 0.09 |
| Strength of oil flavor | 0.18 | * | 0.82 |
| Goodness of oil flavor | 0.36 | | 0.27 |
| Strength of aftertaste | 0.09 | ? | 0.55 |
| Overall Evaluation | 5.27 | | 5.00 |

\*\*: $p < 0.01$,
\*: $p < 0.05$,
?: $p < 0.3$

Cooking of Japanese Deep-fried Food ("Tempura")

Butter beans were dipped into deep-fry batter made of one egg, one cup-volume of wheat flour, 3/4 cup-volume of water and deep-fried at 180° C. for one min. Each piece of Tempura was dished up on a plate and subjected to the sensory evaluation. The results of the sensory evaluation are summarized in TABLE 8, which demonstrate that the food cooked with the refined sesame oil comprising a lot of lignans got the same overall evaluation as that with the salad oil for household use and better evaluation in oil aroma.

TABLE 8

| Evaluation Item | Salad oil | T-test | Refined sesame oil comprising a lot of lignans |
|---|---|---|---|
| Strength of oil aroma | 0.00 | ? | −0.38 |
| Goodness of oil aroma | 0.00 | ? | 0.38 |
| Strength of oil flavor | 0.00 | | −0.13 |
| Goodness of oil flavor | 0.00 | | 0.00 |
| Texture of | 0.00 | | −0.13 |

TABLE 8-continued

| Evaluation Item | Salad oil | T-test | Refined sesame oil comprising a lot of lignans |
|---|---|---|---|
| Tempura Overall Evaluation | 5.00 | | 4.75 |

\*\*: $p < 0.01$,
\*: $p < 0.05$,
?: $p < 0.3$

What is claimed is:

1. A method for the production of refined sesame oil without a bitter taste having at least 1% by weight sesamin and not more than 0.2% sesaminol comprising,
    providing unparched sesame seeds that yield a crude sesame seed oil with at least 1% by weight sesamin upon milling, pressing or extraction,
    milling unparched sesame seeds,
    extracting oil from the milled sesame seeds using solvent extraction, and
    bleaching the extracted sesame oil with activated carbon or a clay,
    wherein the bleaching step is carried out at a temperature from 5° C. to 70° C. when the bleaching is performed with clay.

2. The method for the production of refined sesame oil according to claim 1, wherein 0.1% to 3% by weight clay is used in the bleaching step.

3. The method for the production of refined sesame oil according to claim 1, wherein the solvent extraction is performed a solvent selected from the group consisting of hexane, diethyl ether, acetone, methanol and ethanol.

4. The method for the production of refined sesame oil according to claim 1, wherein the solvent extraction is performed with hexane.

5. The method for the production of refined sesame oil according to claim 1, further comprising removing the clay or activated carbon after the bleaching step.

6. The method for the production of refined sesame oil according to claim 5, further comprising deodorizing the bleached sesame oil after the clay or activated carbon is removed.

7. The method for the production of refined sesame oil according to claim 1, wherein the bleaching step is carried out for about 30 minutes.

8. The method for the production of refined sesame oil according to claim 1, further comprising treating the extracted sesame oil with alkali before the bleaching step.

9. The method for the production of refined sesame oil according to claim 1, wherein the bleaching step is carried out at a temperature from 40° C. to 70° C. with clay.

10. The method for the production of refined sesame oil according to claim 4, wherein the bleaching step is carried out at a temperature from 60° C. to 70° C. with clay.

11. The method for the production of refined sesame oil according to claim 1, wherein 0.5% to 1% by weight clay is used in the bleaching step.

12. The method for the production of refined sesame oil according to claim 1, further comprising degumming the oil after the extracting step.

13. The method for the production of refined sesame oil according to claim 1, further comprising dewaxing the oil after the bleaching step.

14. The method for the production of refined sesame oil according to claim 1, wherein said bleaching is carried out with activated carbon.

15. The method for the production of refined sesame oil according to claim 1, wherein said bleaching is carried out with clay.

* * * * *